United States Patent
Maurizzi et al.

(10) Patent No.: US 6,607,131 B1
(45) Date of Patent: Aug. 19, 2003

(54) READING METHOD AND READER FOR AN OPTICAL CODE

(75) Inventors: Massimo Maurizzi, Castel Maggiore (IT); Maurizio De Girolami, Calderara di Reno (IT)

(73) Assignee: Datalogic S.p.A. (IT)

( * ) Notice: Subject to any disclaimer, the term of this patent is extended or adjusted under 35 U.S.C. 154(b) by 0 days.

(21) Appl. No.: 09/283,155

(22) Filed: Apr. 1, 1999

(30) Foreign Application Priority Data

Apr. 2, 1998 (EP) .............................. 98830202

(51) Int. Cl.⁷ ................................ G06K 7/10
(52) U.S. Cl. ........................ 235/462.26; 235/462.25; 235/462.31; 235/462.49
(58) Field of Search ................ 235/454, 462.25, 235/462.26, 462.3, 462.45, 462.31, 462.05, 462.49, 472.03

(56) References Cited

U.S. PATENT DOCUMENTS

| | | | | |
|---|---|---|---|---|
| 3,925,639 A | * | 12/1975 | Hester | 235/462.31 |
| 3,949,233 A | * | 4/1976 | Gluck | 235/462.26 X |
| 4,160,156 A | * | 7/1979 | Sherer | 235/462.05 |
| 4,240,064 A | * | 12/1980 | DevChoudhury | 235/462.3 X |
| 4,845,349 A | * | 7/1989 | Cherry | 235/462.31 |
| 5,212,370 A | * | 5/1993 | Wittensoldner et al. | 235/462.31 X |
| 5,248,871 A | * | 9/1993 | Takenaka | 235/462.26 |
| 5,260,553 A | * | 11/1993 | Rockstein et al. | 235/462.31 X |
| 5,260,554 A | | 11/1993 | Grodevant | 235/462.31 |
| 5,280,162 A | | 1/1994 | Marwin | 235/462.31 |
| 5,449,891 A | * | 9/1995 | Giebel | 235/462.31 X |
| 5,484,992 A | * | 1/1996 | Wilz et al. | 235/462.31 X |
| 5,729,722 A | | 3/1998 | Matsumoto | 395/560 |
| 5,811,785 A | * | 9/1998 | Heiman et al. | 235/472.01 |
| 5,880,452 A | * | 3/1999 | Plesko | 235/472.01 |
| 5,996,895 A | * | 12/1999 | Heiman et al. | 235/462.45 X |
| 6,050,490 A | * | 4/2000 | Leichner et al. | 235/462.49 |
| 6,427,917 B2 | * | 8/2002 | Knowles et al. | 235/462.45 X |

FOREIGN PATENT DOCUMENTS

| | | |
|---|---|---|
| EP | 0 419 908 A2 | 4/1991 |
| EP | 0 907 138 A2 * | 4/1999 |

* cited by examiner

Primary Examiner—Michael G. Lee
Assistant Examiner—Jared J. Fureman
(74) Attorney, Agent, or Firm—Lerner, David, Littenberg, Krumholz & Mentlik, LLP

(57) ABSTRACT

Reading method for an optical code using a reader which comprises photoemitters, photoreceivers and a processor circuit, in which the following steps are carried out: emitting radiation toward the exterior of the reader; detecting the presence of at least one operating condition of the reader; activating a first operating mode in the absence of the operating condition of the reader; and activating a second operating mode on detection of the operating condition.

18 Claims, 3 Drawing Sheets

READING METHOD AND READER FOR AN OPTICAL CODE

The present invention relates to a reading method and a reader for an optical code.

BACKGROUND OF THE INVENTION

Readers are known for optical codes, in particular bar codes, in which a photoemitter (which for example comprises one or more LEDs, a laser beam source etc) illuminates an optical code and a photoreceiver (for example a photodiode, a series of photodiodes, a telecamera etc) detects at least part of the light radiation diffused by the code, in order to generate in response an electrical signal which is modulated by the different color elements of the code. This signal is amplified and decoded, thus extracting the alphanumerical data associated with the optical code itself.

Some types of readers read the code by means of manual activation by an operator. On the other hand, other types of readers remain continually in an operating state in which all the above-described reading operations are carried out. In other words, when they are switched on, these readers remain indefinitely in a single operating state, irrespective of the actual use of the reader itself or of any alterations in the operative environment in which the reader is disposed.

This operating method is not very advantageous since in specific operating conditions, for example when the reader is not being used, it would be advantageous to be able to modify the operating state of the reader, without manual intervention by the operator.

SUMMARY OF THE INVENTION

The main object of the present invention is to provide a reading method and a reader for an optical code, which can alter its own operating state fully automatically.

More specifically, in known portable readers, the electrical signal is amplified by means of an amplifier circuit with a fixed gain, or with automatic gain control.

As is known, the automatic gain control devices increase the amplification gain in the presence of a low or zero-level signal output from the amplifier and decrease the amplification gain in the presence of an output signal which has a high level, in order to keep the level of the output signal substantially constant.

In the operating condition in which the radiation emitted by the photoemitter is not reflected by any surface close to the reader, the luminous radiation received by the photoreceiver is negligible and the signal present at the output of the amplifier is extremely low. In this operating condition, automatic gain control applied to the amplifier would force the gain of the amplifier towards very high values and the low noise voltage which is always present at the input of the amplifier would be greatly amplified, producing at the output a high voltage value similar to that which is detected in normal operating conditions, when the luminous radiation emitted by the photoemitter is diffused by a white surface.

It is clear that such kind of readers would not be of practical use since, in the presence of low or zero radiation detected, the amplifier would immediately increase its own gain and would become saturated.

In addition, some optical code readers of the portable type generally comprise a case which can be grasped, which at one of its ends holds the photoemitters and photoreceivers.

For such readers, the zero or extremely low input signal condition occurs whenever the reader does not face and at a short distance, a reflective surface, since the radiation emitted by the photoemitter, which has low emission power, is lost in the space which surrounds the reader and is not detected by the photoreceiver.

A further object of the present invention is to provide a method and a reader for an optical code, in which alteration of the operating state of the reader allows automatic gain control to function in all operating conditions.

This invention can thus advantageously be used in the field of portable readers.

The above-described object is achieved by the present invention in that it relates to a method for reading an optical code by means of a reader which comprises photoemitter means, photoreceiver means and processor means, characterised in that it comprises the following steps: emitting a radiation towards the exterior of the reader; detecting the presence of at least one operating condition of the said reader; activating a first operating mode in the absence of the said operating condition of the said reader; and activating a second operating mode on detection of the said operating condition.

In this way, the code reader can recognise at least one operating condition, for example non-use and can thus alter its own operating state fully automatically.

More specifically, the said reader also comprises amplifier means with automatic gain control and corresponding to the said first operating mode the said automatic gain control is inhibited, whereas corresponding to the said second operating mode, the said automatic gain control is activated.

In addition, the said first operating mode comprises at least one energy-saving step.

In this way, the automatic gain control is switched on fully automatically before the reader reads the code. Similarly, if the aforementioned operating condition is not present, the automatic gain control is switched off, such that it cannot be activated inappropriately and consequently saturate the amplifier. When the reader is not reading, an energy saving strategy is also implemented in order to prevent the batteries of The reader from being discharged quickly.

BRIEF DESCRIPTION OF THE DRAWINGS

The invention is now described with reference to the attached drawings which represent a preferred, nonlimiting embodiment of it, in which.

DETAILED DESCRIPTION OF THE INVENTION

Figure 1:
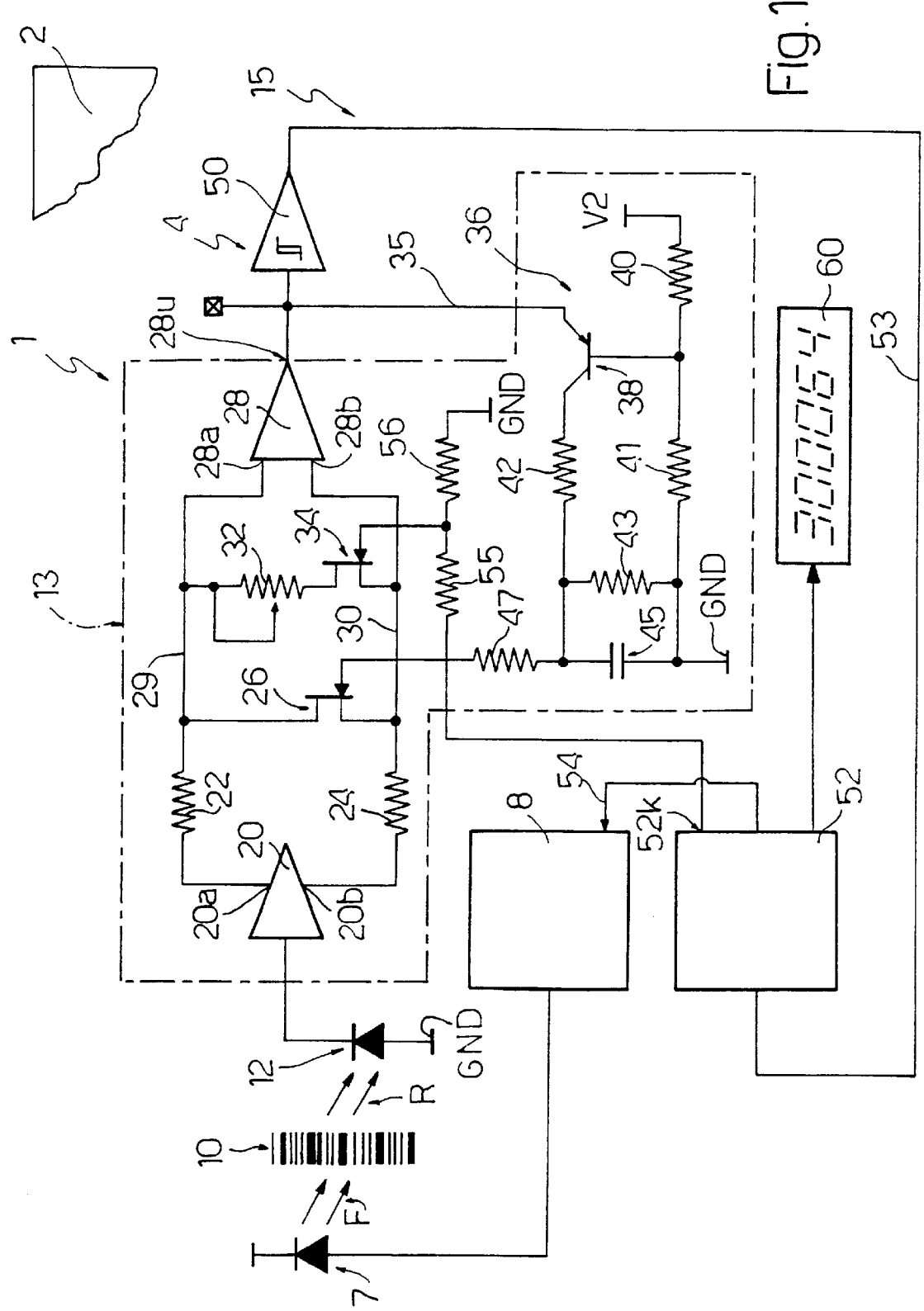
FIG. 1 illustrates a simplified circuit diagram of a reader for optical codes, in particular bar codes, according to the present invention.
Figure 3A:
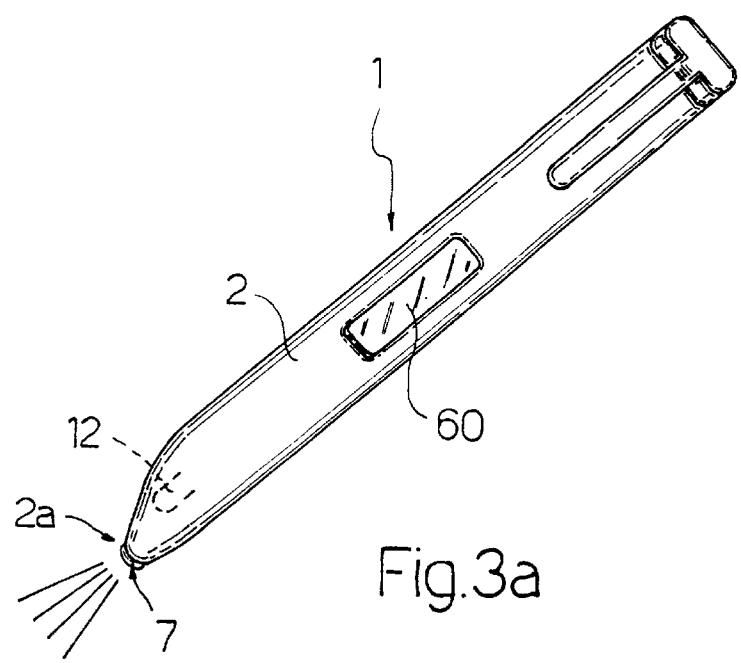
FIG. 3a illustrates the code reader in a first operating condition.
Figure 3B:
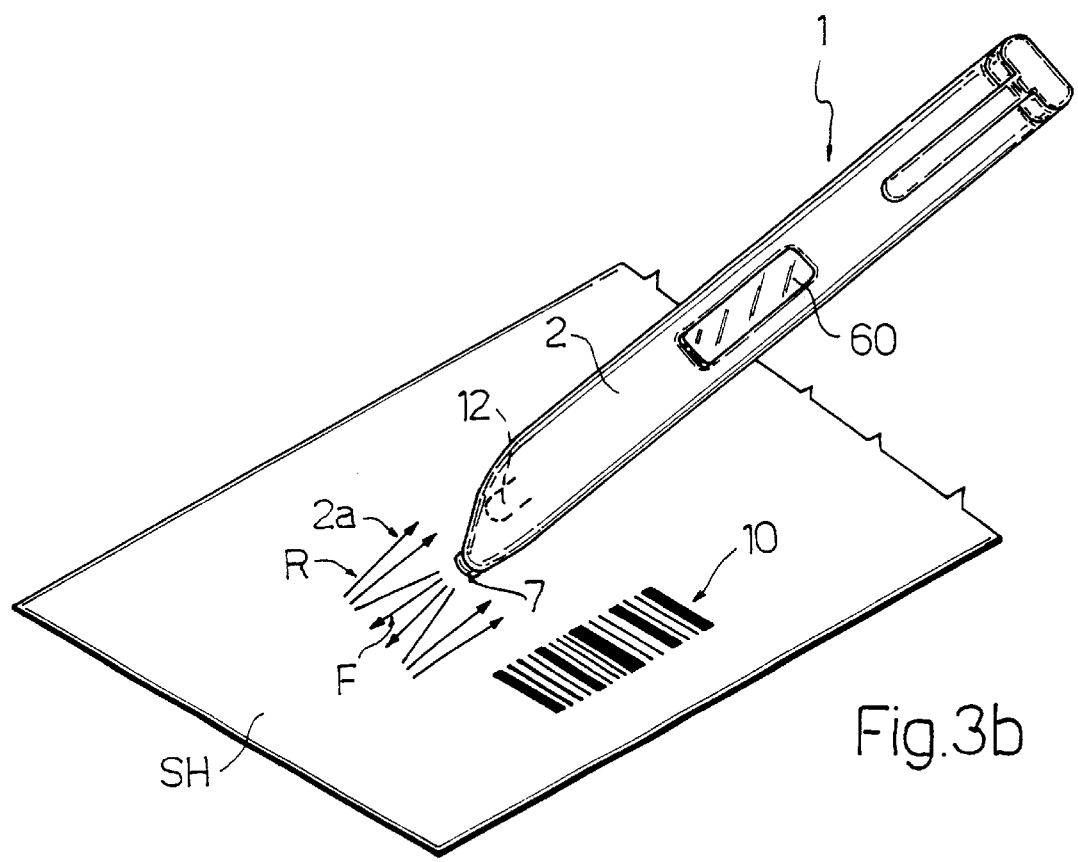
FIG. 3b illustrates the code reader in a second operating condition.

In FIG. 1, 1 indicates as a whole a portable-type reader for an optical code, comprising an outer case 2 which can be grasped (FIGS. 3a and 3b) and has a generally elongate shape (for example the shape of a pen), an electronic circuit 4 accommodated in the case 2 and a source of power, for example a rechargeable-type battery (not shown) which is accommodated in the case 2.

The electronic circuit 4 comprises:

a photoemitter 7, which advantageously consists of an LED, which is disposed in the vicinity of a first end 2a (FIGS. 3a, 3b) of the elongate case 2 and can emit an optical scanning beam F to the exterior of the case 2, in order to illuminate an optical code 10, in particular a bar code which is to be read;

a circuit 8 for driving the photoemitter 7;

a photoreceiver 12, which advantageously consists of a photodiode, which is disposed in the vicinity of the first end of the case 2 and is optionally associated with an optical focussing system (not shown) in order to receive the luminous radiation R diffused by the optical code 10;

an amplifier 13 with automatic gain control (described hereinafter) able to receive the signal generated by the photoreceiver 12 in order to amplify it in a controlled manner in accordance with the methods which will be explained hereinafter;

a microprocessor control and decoding circuit 15 which receives output signals coming from the amplifier 13 and able to control the driving circuit 8 of the photoemitter 7 and the amplifier 13.

The amplifier 13 comprises a signal amplifier circuit 20 which has an input connected to the cathode of the photodiode 12 (the anode of the photodiode 12 is connected to a reference potential GND), a first output 20a connected to a first terminal of a resistor 22 and a second output 20b connected to a first terminal of a resistor 24. The resistors 22 and 24 have second terminals which are connected to one another by means of a JFET field-effect transistor 26, which acts as a variable resistor with a resistance value which depends on the voltage applied to the gate terminal of the transistor 26 itself.

The amplifier 13 also comprises a differential signal amplifier 28 which has a first input 28a connected to the second terminal of the resistor 22 by means of a line 29 and a second input 28b connected to the second terminal of the resistor 24 by means of a line 30. A variable resistor 32, which advantageously consists of a potentiometric trimmer, has a first terminal connected to the line 29 and a second terminal connected to the line 30 by means of a switch 34 which advantageously consists of a JFET field-effect transistor.

The differential amplifier 28 has an output 28u which is connected by means of a line 35 to a comparator circuit 36 which forms part of the amplifier 13. In particular, the comparator circuit 36 comprises a PNP bipolar transistor 38 which has an emitter which communicates with the line 35, a base which is connected to first terminals of resistors 40 and 41 and a collector which is connected to a first terminal of a resistor 42. The resistor 40 has a second terminal which is connected to a positive reference potential V2 and the resistor 41 has a second terminal which is connected to the second terminal of the resistor 42 by means of a resistor 43. The second terminal of the resistor 41 is also connected to the reference potential GND and to a first terminal of a capacitor 45 which has a second terminal connected to the second terminal of the resistor 42. The capacitor 45 is thus disposed in parallel with the resistor 43 and the second terminal of the capacitor 45 communicates with the gate of the JFET transistor 26 via a resistor 47.

The control and decoding circuit 15 comprises a binary coding circuit 50 of a known type which has an input which communicates with the output 28u and an output which communicates with a microprocessor 52 via a data line 53.

Using the methods which will be explained hereinafter with the assistance of FIG. 2, the microprocessor 52, which is part of the circuit 15, controls the driving circuit 8 (by means of signals transmitted along a data line 54) and the amplifier 13.

The microprocessor 52 has a control output 52k which communicates via a resistor 55 with the gate terminal of the JFET transistor 34; the gate terminal of the transistor 34 is also connected to a first terminal of a resistor 56, which has a second terminal connected to the reference potential GND.

Figure 2:
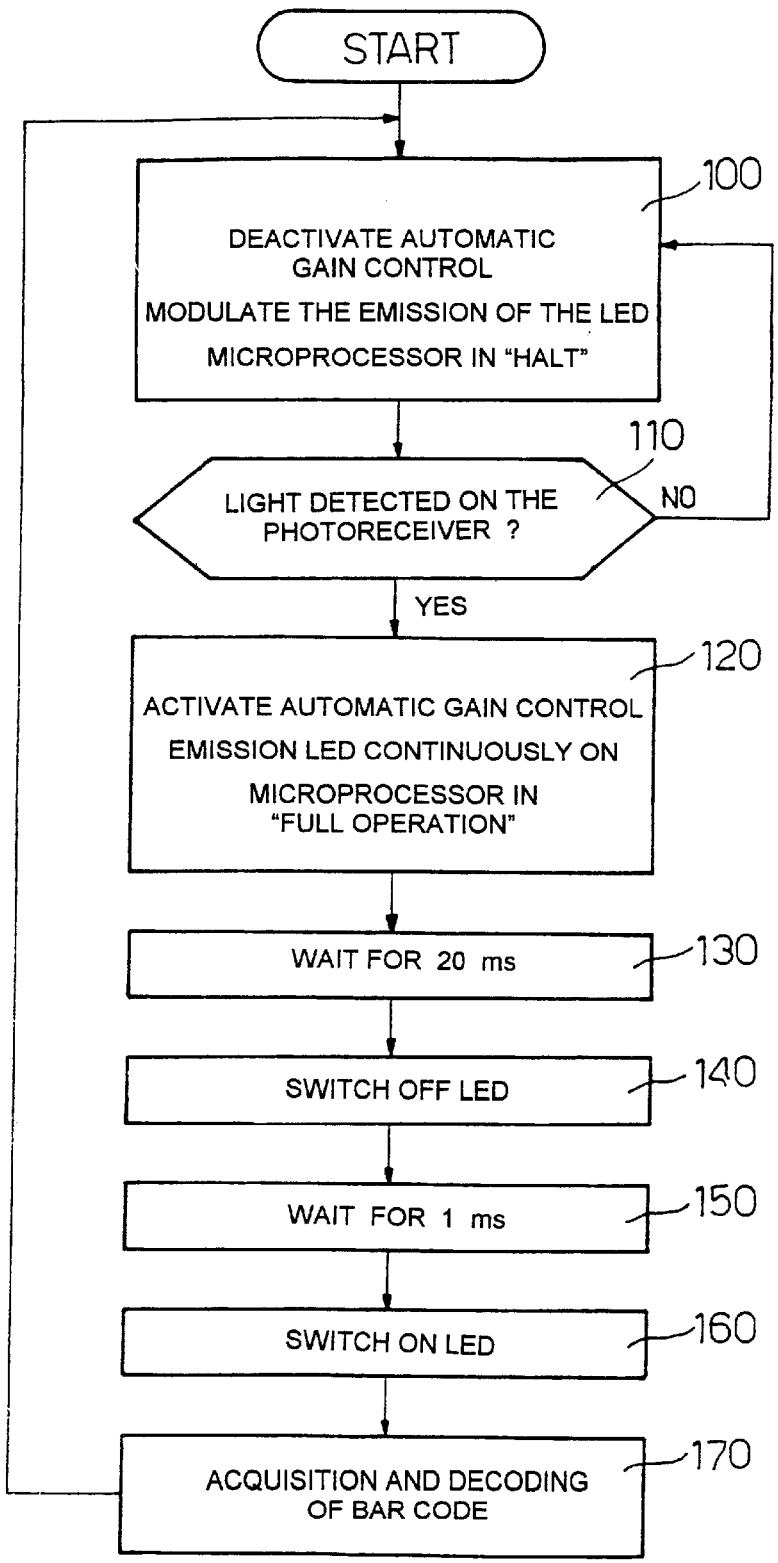
FIG. 2 illustrates a logic diagram of the reading method according to the present invention.

With particular reference to FIG. 2, a description is now provided of the functioning of the microprocessor 52 in controlling the driving circuit 8 of the LED 7 and the amplifier 13, with automatic gain control.

From a starting block (START) there is transition to a block 100 which de-activates the automatic gain control inside the amplifier circuit 13. In order to carry out this function, the microprocessor 52 brings its output 52k to a high voltage value (for example +5 V) applied to the voltage divider formed by the resistors 55 and 56; the (positive) voltage which is present at the first terminal of the resistor 56 is thus applied to the gate of the JFET transistor 34, which closes, connecting the variable resistor 32 directly between the lines 29 and 30. In addition, the resistance value of the variable resistor 32 is low and lower than the resistance value provided by the JFET transistor 26; the resistance provided by the JFET transistor 26 (which is disposed in parallel with the variable resistor 32) can thus be disregarded. In this way, the voltage present between the outputs 20a and 20b of the amplifier 20 is distributed on the resistive divider formed by the resistor 22, the variable resistor 32 and the resistor 24 and the voltage present at the ends of the resistor 32 is applied to the inputs of the amplifier 28. The resistance of the resistor 32 is also lower than that of the resistors 22 and 24 and the voltage present at this resistor 32 is thus low compared with the voltage applied to the ends of the afore-mentioned resistive divider. For this reason, during deactivation of the automatic gain control, the amplifier 28 is supplied with a small portion of the voltage which is present between the outputs 20a and 20b and thus the amplifier 13 as a whole achieves limited gain.

Furthermore any variation of the resistance provided by the JFET transistor 26 does not affect significantly the overall resistance value constituted by the JFET transistor 26 and by the resistor 32 disposed in parallel, since the (lower) resistance value of the resistor 32 prevails.

In addition, for as long as it remains within block 100, the microprocessor 52 controls the driving circuit 8 with a pulse operating mode according to which the photoemitter 7 emits short pulses of light separated by periods of rest in which the photoemitter 7 remains switched off. This "pulse" operating mode of the photoemitter 7 is used in order to save energy, since the charge stored in the battery (not shown) of the reader 1 is normally low.

Also, for as long as the microprocessor 52 remains within block 100, it operates according to an energy-saving mode and carries out a limited number of functions (HALT state).

Thus, as well as deactivating the automatic gain control, the block 100 also carries out an energy-saving function in order to minimize the current drawn by the circuit 4 from the battery (not shown) of the reader 1.

The block 100 is followed by a block 110 which detects the presence of light on the photoreceiver 12. If the block 110 detects a significant quantity of light on the photoreceiver 12, the block 110 is followed by a block 120, otherwise the wait continues and there is a return from block 110 to block 100.

The absence of detected light on the photoreceiver 12 (FIG. 3a) normally relates to the operating condition in which the reader 1 is disposed with the first end 2a distant from any reflective surface and the pulse luminous radiation emitted by the LED 7 is lost in the space which surrounds the reader 1. The photoreceiver 12 therefore generates a substantially zero signal and thus the output 28u goes to a low voltage value.

On the other hand when the reader 1 is disposed with the first end close (FIG. 3b) to a reflective surface SH, the pulse luminous radiation F emitted by the LED 7 is reflected by this surface SH and is transmitted (diffuse radiation R) to the photoreceiver 12, which produces a signal which changes from the previous value (substantially zero) to a higher value. This signal is amplified by the amplifier 13 which, although it has low gain, provides the output 28u with a signal with a value other than zero, which is supplied to the binary coding circuit 50, which squares this signal, producing as output a signal on two levels, one low and one high. This signal on two levels is supplied via the line 53 to the microprocessor 52 which, in response, progresses from block 110 to block 120. The microprocessor 52 thus detects the change of operating condition, since there is transition from a first operating condition in which substantially no diffused light is detected, since the reader 1 is distant from reflective surfaces, to a second operating condition in which diffused light is detected, since the reader 1 is close to reflective surfaces and is ready to read a code.

Alternatively, the reader 1 could comprise a comparator circuit in order to activate the automatic gain control when the input signal to the amplifier 13, or the signal subsequently amplified and present at the output 28u, assumes a predetermined relationship and in particular is greater than a reference value. In addition the reader 1 could comprise a proximity detector, for example an ultrasound distance detector (not shown), which is disposed in the end portion 2a of the case 2, able to activate the automatic gain control when the distance between the portion 2a and the surface on which the code is disposed is smaller than a threshold value. According to this variant, activation of the automatic gain control would take place after the reader approaches a surface on which the code is disposed.

The block 120 activates the automatic gain control inside the amplifier circuit 13. As block 120 is entered, the "pulse" operating mode of the photoemitter 7 ends and the latter is now made to function in accordance with a "steady state" operating mode, according to which the photoemitter 7 produces a flow of light which is continuous over a period of time. In addition, as block 120 is entered, the energy-saving mode of the microprocessor 52 is ended and the latter now operates at full power carrying out all its functions, including those which were previously inhibited or carried out in a reduced form.

In order to activate the automatic gain control, the microprocessor 52 sets its output 52k to a low voltage value (for example 0 V) or a negative voltage, which is applied to the voltage divider formed by the resistors 55 and 56. Thus no voltage is applied to the gate of the JFET transistor 34 (or a negative voltage is applied) and the switch 34 opens, disconnecting the variable resistor 32 from the lines 29 and 30.

In this way, the voltage which is present between the outputs 20a and 20b of the amplifier 20 is distributed on the resistive divider formed by the resistor 22, the JFET transistor 26 and the resistor 24 and the voltage present on the JFET transistor 26 is applied to the inputs of the amplifier 28.

The resistance presented by the JFET transistor 26 is also variable on the basis of the driving signal which is present at the gate itself and is comparable with that of the resistors 22 and 24. Thus the voltage which is present on the JFET transistor 26 is a significant portion of the voltage applied to the ends of the aforementioned resistive divider. On this basis, during activation of the automatic gain control, the amplifier 28 is supplied with a significant portion of the voltage which is present between the outputs 20a and 20b and thus the amplifier 13 as a whole achieves high gain.

This gain is also variable according to the resistance value presented by the JFET transistor 26; this resistance value varies according to the voltage applied to the gate of the JFET transistor 26 itself.

In turn, the voltage applied to the gate of the JFET transistor 26 varies according to the voltage present at the output 28u, since an increase in the voltage present at the output 28u is applied directly to the emitter of the PNP transistor 38, which then conducts (if it had previously been switched off), or goes towards a state of increased conduction (if it was already switched on), charging the capacitor 45 by means of a flow of current which passes through the resistor 42. The (positive) voltage which is present at the second terminal of the capacitor 45 is applied to the gate of the JFET transistor 26, the resistance at the ends of which is decreased. The decrease in the resistance provided by the JFET transistor 26 gives rise to a decrease in the voltage applied to the inputs of the amplifier 28 and thus also to a decrease in the voltage present at the output 28u. In this way, the increase in the level of the signal present at the output 28u is counter-balanced by a decrease in the gain of the amplifier 13, thus keeping the level of the signal at the output 28u substantially constant.

Similarly, a decrease in the level of the signal present at the output 28u is applied to the emitter of the PNP transistor 38, which tends to switch off (if it had previously been switched on) and go towards a state of decreased conduction. The flow of load current is thus interrupted to the capacitor 45, which is discharged via the resistor 43. The voltage (decreasing towards zero values) present at the second terminal of the capacitor 45 is applied to the gate of the JFET transistor 26, which tends to switch off and thus increase the resistance present at its ends. The increase in the resistance provided by the JFET transistor 26 gives rise to an increase in the voltage applied to the inputs of the amplifier 28 and thus also to an increase in the voltage present at the output 28u. In this way, the decrease in the level of the signal present at the output 28u is counter-balanced by an increase in the gain of the amplifier 13, thus keeping the level of the signal at the output 28u substantially constant.

It has been found that in some situations of use of the reader 1, for example after activation of the automatic gain control, overshoot is generated at the output 28u, caused by the fact that the capacitor 45 had been discharged.

The consequent rapid charging of the capacitor 45 leads to a rapid drop in the signal 28u, towards a steady-state value.

This transitory phenomenon causes formation, at the output 28u, of a triangular pulse which has an extremely steep falling edge. The triangular pulse is applied to the input of the binary coding circuit 50, which could interpret this pulse as the falling edge caused by the transition from a white element (or space) to a black element, which has taken place during reading of a bar code.

In addition, if after this transitory phenomenon a bar code is actually read, the first rising edge caused by the (real) transition between a black element and a white element will be interpreted as the end of this imaginary black element generated by the triangular pulse. Thus a (non-existent)

black element is read which has a width which is not comparable with the width of the typical elements of the bar codes, thus making subsequent decoding of the bar code itself impossible. In order to eliminate the effects of this transitory phenomenon, after the descending front of the triangular pulse, the reader according to the present invention is able to carry out a step of resetting of the reader 1.

This resetting is obtained by switching off the photoemitter 7 (for about 1 millisecond), then switching it on again.

To this purpose, the block 120 is followed by a block 130 which generates a wait of 20 milliseconds in order for the amplifier with automatic gain control to go into the steady state condition and for the overshoot to be ended with certainty. On completion of the wait in block 130, there is transition to a block 140 which switches off the photoemitter 7; this ensures that the reader 1 is switched off when the overshoot has ended.

The block 140 is followed by a block 150, which generates a wait of 1 millisecond necessary to allow all the circuits of the reader 1 to go into the steady state condition; in addition, during the wait, the capacitor 45 does not have time to discharge. After the wait implemented by the block 150 there is transition to a block 160, which switches or the photoemitter 7 once more. On this basis, the reader 1 is switched on with the capacitor 45 loaded such that after this switching on has taken place, no further overshoot can be generated. The decoding carried out by the reader 1 after the switching on process carried out in block 160 will thus be entirely free from disturbances caused by the above-described transitory phenomenon.

On this basis, block 160 is followed by a block 170 which commands acquisition and decoding of the optical code 10.

In particular, in order to carry out acquisition and decoding of the code, the first end of the reader 1 is slid onto the code 10 and the photoreceiver 12 receives the radiation R diffused by successive adjacent portions of the code, whilst the reader 1 is moved manually with respect to the code itself; in this way, the photoreceiver 12 generates an analog signal which is modulated by the succession of elements of a different color of the code (for example light and dark bars in the case of reading of a bar code). This analogue signal comprises a sequence of high-level areas (corresponding to the spaces), separated by low-level areas (corresponding to the bars of the code). The analogue signal is amplified by the amplifier 13 and digitised by the binary coding circuit 50. The signal digitised by the binary coding circuit 50 is transmitted to the microprocessor 52 which decodes the optical code (in a known manner).

In particular, the alphanumerical data supplied by the output of the microprocessor 52 is transmitted to a display unit 60 (which for example consists of a liquid crystal display), which co-operates with the microprocessor 52 to display the data obtained from reading the optical code 10.

The optical code 10 is thus read with the automatic gain control active; this compensates for any variations of ambient light, different inclinations of reading, ageing of the components and variations caused by the temperature etc.

On completion of the operations of block 170, there is a return to block 100, which once more deactivates the automatic gain control, re-supplies the LED 7 in the pulse mode and puts the microprocessor 52 into the halt state. The microprocessor 52 thus commands fully automatically the return to the first operating mode, from which it will exit on the basis of a subsequent detection of diffused light.

What is claimed is:

1. A method for reading an optical code using a reader manually scanned across the optical code which comprises a photoemitter, photoreceiver means and processor means, said method comprising:

emitting radiation from said photoemitter in a first operating mode of said reader out of said reader;

detecting an instantaneous amount of radiation received by said reader when in said first operating mode;

continuing emitting said radiation from said photoemitter in said first operating mode when said instantaneous amount of radiation received is lower than a predetermined and fixed reference value; and emitting radiation for reading said optical code from said photoemitter in a second operating mode of said reader when said instantaneous amount of radiation received is greater than said predetermined and fixed reference value, wherein said step of emitting radiation in said second operating mode includes:

switching on said photoemitter;

switching off said photoemitter prior to reading said optical code;

switching on said photoemitter in order to supply radiation for reading said optical code; and reading said optical code.

2. The method according to claim 1, wherein said manual reader further comprises amplifier means with automatic gain control, said automatic gain control being inhibited when said manual reader is in said first operating mode and said automatic gain control being activated when said manual reader is in said second operating mode.

3. The method according to claim 1, wherein said first operating mode comprises at least one energy-saving step.

4. The method according to claim 1, wherein said manual reader further comprises means for regulating emission of said radiation such that during said first operating mode, said radiation is emitted from said photoemitter discontinuously over a period of time, and such that during said second operating mode, said radiation is emitted from said photoemitter continuously over a period of time.

5. The method according to claim 1, wherein said processor means includes a low-consumption operating state and a high-consumption operating state that can be selected alternatively, such that said low-consumption operating state is activated during said first operating mode, and said high-consumption operating state is activated during said second operating mode.

6. The method according to claim 5, wherein said steps of switching off and switching on said photoemitter are preceded by respective waiting steps.

7. A reader for reading an optical code by manually scanning said reader across said optical code, comprising:

a photoemitter operable to emit radiation out of said reader;

a photoreceiver for detecting instantaneous radiation received by said reader;

a comparator operable to receive an input signal corresponding to an intensity of said instantaneous radiation detected by said photoreceiver; and a processor cooperating with said comparator to (i) command emission of radiation by said photoemitter in a first operating mode of said reader whenever said input signal is less than at least one predetermined and fixed reference value, and (ii) command emission of radiation to read said optical code by said photoemitter in a second operating mode of said reader whenever said input signal is greater than said at least one predetermined and fixed reference value, wherein after said first operating mode is deactivated, said processor is operable to switch on said photoemitter; switch off said photoemitter prior to reading said optical code; switch on said photoemitter in order to supply radiation for reading said optical code; and read said optical code.

8. The reader according to claim 7, further comprising an amplifier having automatic gain control and operable to receive an electrical signal from said photoreceiver and, wherein said processor is further operable to disable said automatic gain control in said first operating mode, and enable said automatic gain control in said second operating mode to instantaneously control said amplifier gain.

9. The reader according to claim 7, further comprising means for energy saving, which can be activated during said first operating mode.

10. The reader according to claim 9, wherein said energy-saving means includes means for regulating said radiation such that said photoemitter emits said radiation discontinuously over a period of time during said first operating mode and emits said radiation continuously over a period of time during said second operating mode.

11. The reader according to claim 7, wherein said processor includes a low-consumption operating state and a high-consumption operating which can be selected alternately, such that in said first operating mode, said low-consumption operating state is activated, and in said second operating mode, said high-consumption operating state is activated.

12. The reader according to claim 7, wherein said reader is portable and comprises a case that can be grasped and that holds said photoemitter and said photoreceiver.

13. A method for reading an optical code using a reader which comprises a photoemitter, a photoreceiver, a processor, said method comprising:

emitting radiation from said photoemitter out of said reader;

monitoring at least one operating condition of said reader;

activating a first operating mode of said reader when said operating condition is not detected, said radiation being emitted from said photoemitter in a discontinuous manner in said first operating mode; and activating a second operating mode of said reader when said operating condition is detected, wherein in said second operating mode, said photoemitter is activated to emit said radiation in a continuous manner, said photoemitter is then deactivated prior to any reading attempt of said optical code, and said photoemitter is then activated to emit said radiation in a continuous manner and to read said optical code.

14. The method according to claim 13, wherein said steps of deactivating said photoemitter and then activating said photoemitter to emit said radiation in a continuous manner are preceded by respective waiting steps.

15. A reader for an optical code, comprising:

a photoemitter operable to emit radiation onto said optical code;

a photoreceiver for detecting at least part of said radiation diffused by said optical code;

an amplifier having automatic gain control and operable to receive an electrical signal from said photoreceiver; and a processor having a detector operable to receive said electrical signal from said amplifier and to detect a presence of at least one operating condition of said reader based thereon, said processor (i) activating a first operating mode of said reader when said operating condition is not detected, said automatic gain control being disabled in said first operating mode; (ii) activating a second operating mode of said reader when said operating condition is detected, said automatic gain control being enabled in said second operating mode; (iii) activating said photoemitter for a time that is sufficient to permit any overshoot of said amplifier to end; (iv) subsequently deactivating said photoemitter; and (v) subsequently activating said photoemitter in order to carry out illumination and reading of said optical code.

16. A reader for an optical code, comprimising:

a photoemitter operable to emit radiation onto said optical code;

a photoreceiver for detecting at least part of said radiation diffused by said optical code;

an amplifier having automatic gain control and operable to receive an electrical signal from said photoreceiver; and a processor having a detector operable to receive said electrical signal from said amplifier and to detect a presence of at least one operating condition of said reader based thereon, said processor (i) activating a first operating mode of said reader when said operating condition is not detected, said automatic gain control being disabled in said first operating mode; (ii) activating a second operating mode of said reader when said operating condition is detected, said automatic gain control being enabled in said second operating mode, wherein said amplifier comprises:

a first signal amplifier connected at an input to said photoreceiver;

a resistive divider for receiving at least part of an output signal of said first signal amplifier and including a resistor having a variable resistance controlled by a command signal, said command signal being correlated to a level present at an output of said amplifier;

second signal amplifier means for receiving an intermediate signal that includes at least part of a signal present on said resistor, said intermediate signal being variable based on said command signal whenever said second operating mode is activated.

17. The reader according to claim 16, wherein said amplifier further includes an auxiliary resistor in parallel with said resistor in order to render negligible a variation in said intermediate signal caused by a variation of said command signal, said auxiliary resistor being available in parallel to said resistor whenever said first operating mode is activated.

18. The reader according to claim 17, wherein said resistor includes a field-effect transistor.

* * * * *

UNITED STATES PATENT AND TRADEMARK OFFICE
CERTIFICATE OF CORRECTION

PATENT NO. : 6,607,131 B1
DATED : August 19, 2003
INVENTOR(S) : Massimo Maurizzi and Maurizio De Girolami It is certified that error appears in the above-identified patent and that said Letters Patent is hereby corrected as shown below:

Column 2,
Line 42, "of The" should read -- of the --.

Column 7,
Line 23, "or" should read -- on --.

Column 8,
Line 46, "claim 5," should read -- claim 1 --.

Column 9,
Line 25, after "operating", insert -- state --.

Signed and Sealed this

Sixth Day of January, 2004

JAMES E. ROGAN
*Director of the United States Patent and Trademark Office*